United States Patent [19]

Long et al.

[11] 4,445,737
[45] May 1, 1984

[54] ELECTRICAL DISTRIBUTION SYSTEM FOR LIGHTS AND CONNECTORS THEREFOR

[75] Inventors: William B. Long, Camp Hill; Donald L. Metzger, Harrisburg; John R. Shuey, Carlisle, all of Pa.

[73] Assignee: AMP Incorporated, Harrisburg, Pa.

[21] Appl. No.: 322,809

[22] Filed: Nov. 19, 1981

[51] Int. Cl.³ .......................................... H01R 13/00
[52] U.S. Cl. .................. 339/18 C; 339/97 P
[58] Field of Search .................... 339/18 C, 19, 22 R, 339/97 R, 97 P, 99 R

[56] References Cited

U.S. PATENT DOCUMENTS

| | | | |
|---|---|---|---|
| 3,308,422 | 3/1967 | Boysen | 339/19 |
| 3,345,599 | 10/1967 | Henschen et al. | 339/19 |
| 3,464,052 | 8/1969 | Hukin | 339/22 |
| 3,715,627 | 2/1973 | D'Ausilio | 317/99 |
| 3,816,818 | 6/1974 | Meier | 339/99 R |
| 4,030,793 | 6/1977 | Hanlon et al. | 339/19 |
| 4,040,703 | 8/1977 | Shaffer et al. | 339/99 R |
| 4,146,287 | 3/1979 | Jonsson | 339/75 M |
| 4,201,436 | 5/1980 | Genovese et al. | 339/96 |
| 4,223,971 | 9/1980 | Dola et al. | 339/95 D |
| 4,232,927 | 11/1980 | Stull | 339/99 R |
| 4,295,697 | 10/1981 | Grime | 339/22 R |
| 4,312,556 | 1/1982 | Dufau | 339/99 R |

Primary Examiner—Joseph H. McGlynn
Attorney, Agent, or Firm—Adrian J. La Rue; Anton P. Ness

[57] ABSTRACT

An electrical distribution system for an electric lighting system including a plurality of electric lights comprises a lighting connector mounted on each of the plurality of electric lights and including an insulating housing having terminal members therein electrically connected to the electric leads of the light. A control connector has an insulating housing with first and second levels of contact members therein which are interconnected together in a predetermined manner. One of the first and second levels of contact members of the control connector is electrically connectable with the terminal members of one of the lighting connectors and also electrically connectable with electric leads connected to an electrical switch. The other of the first and second levels of contact members of the control connector is electrically connectable to contact elements in an insulating housing of a power-in connector which contact elements are also connected to electric leads connected to a power source. An interconnection connector assembly has insulating housings containing contact terminals therein electrically connected to electric leads extending between the housings, the contact terminals of the housings are electrically connected to the terminal members of respective lighting connectors thereby electrically interconnecting the electric lights.

9 Claims, 18 Drawing Figures

_Fig. 5_

_Fig. 5A_

_Fig. 5B_

ELECTRICAL DISTRIBUTION SYSTEM FOR LIGHTS AND CONNECTORS THEREFOR

FIELD OF THE INVENTION

This invention relates to an electrical distribution system for an electric lighting system or the like including modular electrical connectors connectable in a particular manner to interconnect electric lights and to connect them to a power source and switch.

BACKGROUND OF THE INVENTION

U.S. Pat. No. 4,146,287 discloses an electrical distribution system for a lighting system which utilizes a modular connection scheme to connect a series of lights in one area by use of a power connector that connects to a receptacle in a junction box to supply electrical power to feed-through connectors mounted on and connected to the electrical circuits of all the lights except the first and last. The first light has a similar feed-through connector connected to the light circuit and which receives a connector that terminates the power leads from the connector connected to the power receptacle, receives another connector that terminates the electrical leads from an electrical switch to control the operation of the lighting system and receives another connector terminating the leads from an identical connector connected to the next feed-through connector. The last light has a direct connection to the penultimate light feed-through connector.

This arrangement enables individual lighting systems for a specified area to electrically connect together the lights and to connect the lights to a power source and a switch to control the system, but it does not have the flexibility to connect the lighting systems of other areas together so that a single cable from the power junction box can be used to supply power to lighting systems in adjacent areas, to connect the lights so that different lighting arrangements can be effected as well as controlling their operation.

According to the present invention, an electrical distribution system for an electric lighting system including a plurality of electric lights comprises a lighting connector mounted on each of the plurality of electric lights and including an insulating housing having terminal members therein electrically connected to the electric leads of the light. A control connector has an insulating housing with first and second levels of contact members therein which are interconnected together in a predetermined manner. One of the first and second levels of contact members of the control connector is electrically connectable with the terminal members of one of the lighting connectors and also electrically connectable with electric leads connected to an electrical switch. The other of the first and second levels of contact members of the control connector is electrically connectable to contact elements in an insulating housing of a power-in connector which contact elements are also connected to electric leads connected to a power source. An interconnection connector assembly has insulating housings containing contact terminals therein electrically connected to electric leads extending between the housings, the contact terminals of the housings are electrically connected to the terminal members of respective lighting connectors thereby electrically interconnecting the electric lights.

According to another aspect of the present invention, an electrical connector comprises an insulating housing having a first level of electrical terminals and a second level of electrical terminals. Connecting members extend between selected electrical terminals of the first and second levels of electrical terminals and are springably electrically connected therewith. One of the ends of the electrical terminals of one of the levels of electrical terminals has insulation-displacing sections for electrical connection with electric leads while the other ends of these electrical terminals have spring-biased tines for electrical connection with electric tab members. The electrical terminals of the other level of electrical terminals are feed-through electric tab members.

According to a further aspect of the present invention, an electrical connector comprises an insulating housing having contact-receiving openings therethrough which include stop surfaces therein. Contact members include lead-receiving sections and electric tab members extending outwardly from each end thereof. A slot is located in each of the lead-receiving sections with the metal on each side of the slot being coined outwardly from the plane of the lead-receiving sections and opposing arcuate areas in the slot in alignment with a respective hole in the housing, the holes being in communication with the respective contact-receiving openings. Barbs are located on the lead-receiving sections so that when ends of electric leads are placed in the holes and through the opposing arcuate areas, the contact members are moved along the contact-receiving openings until they engage the stop surfaces whereupon the edges of the slots mechanically score the electric leads thereby forming electrical connection therewith and the barbs secure the contact members in the housing.

DETAILED DESCRIPTION OF PREFERRED EMBODIMENTS

Figure 1:
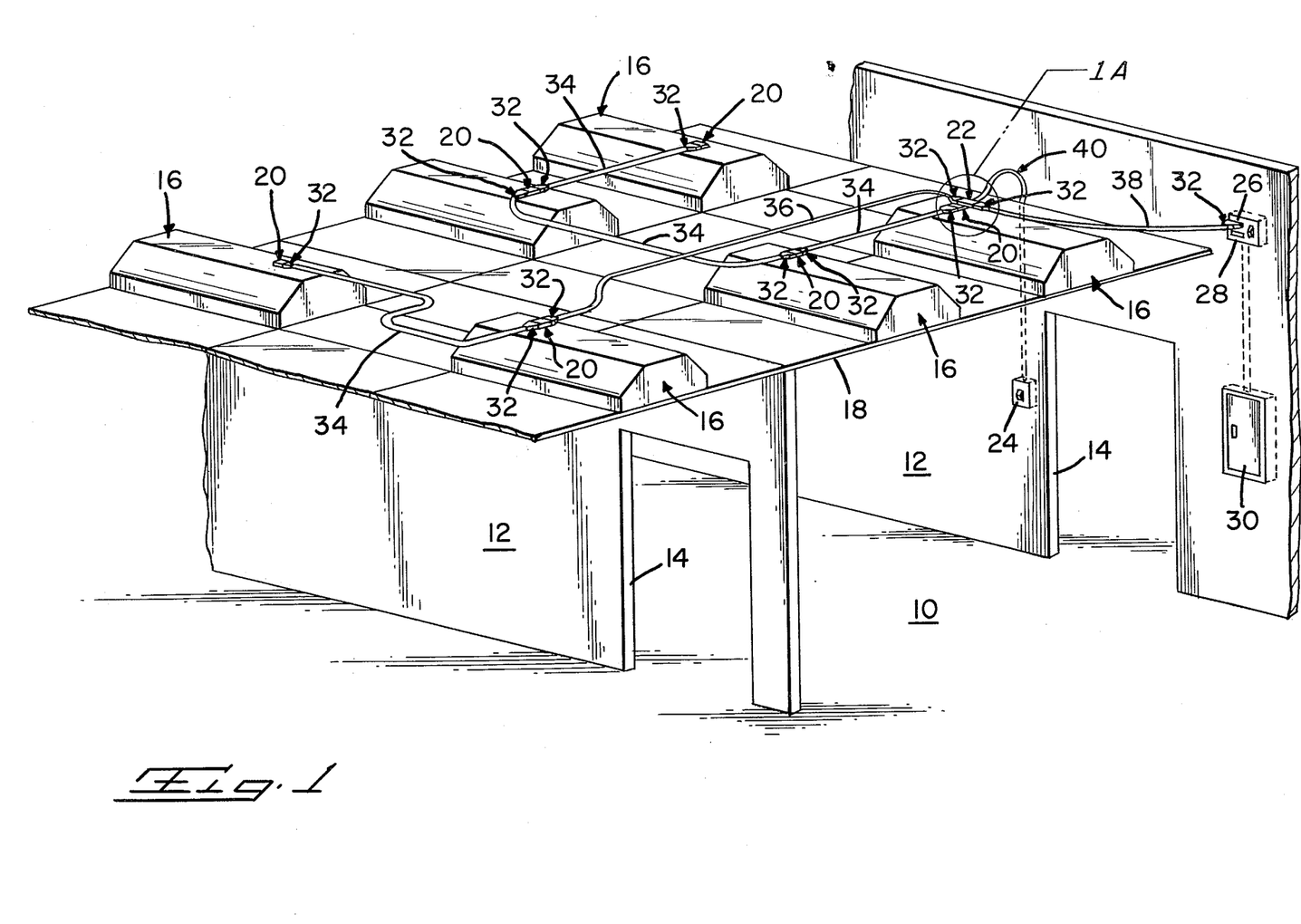
FIG. 1 is a fragmentary perspective view of a section of a building showing the use of the system of the invention by supplying electrical power to electric lights.
Figure 5:
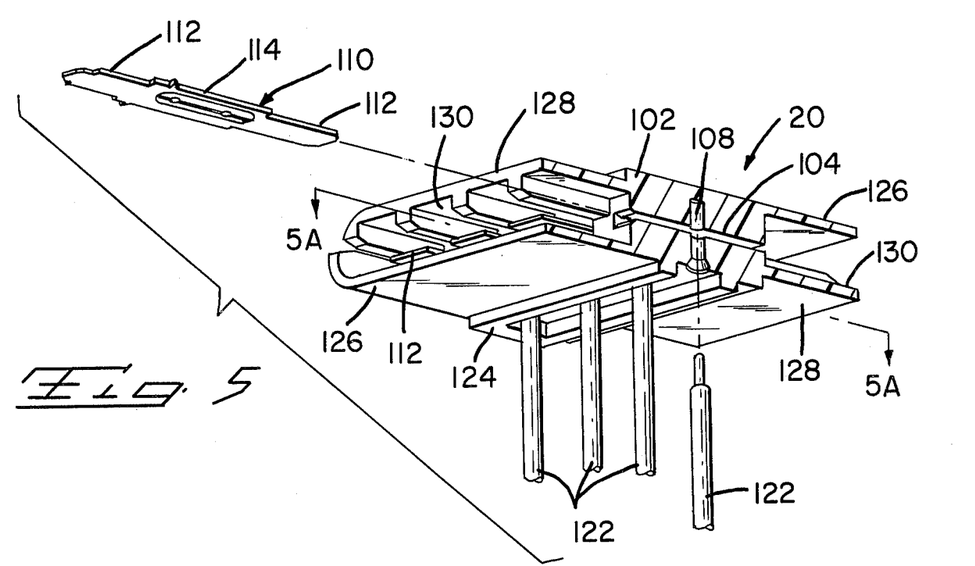
FIG. 5 is a perspective exploded view partly in cross-section of a lighting connector.
Figure 5A:
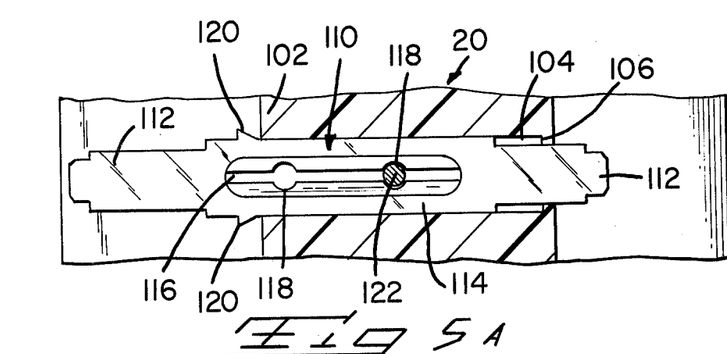
FIGS. 5A and 5B are cross-sectional views of FIG. 5 showing the operation of the contact members to terminate electric leads and secure them in the housing.
Figure 5B:
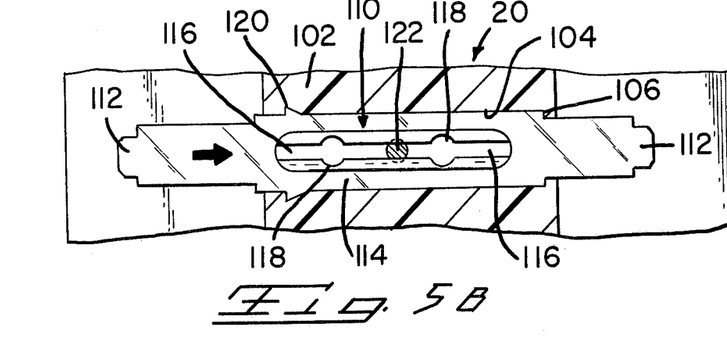

FIG. 1 shows a fragmentary perspective view of a section of a building showing the use of the electrical distribution system of the invention by supplying electrical power to electrical lights. The distribution system can be used to supply any kind of electrical utilization device. A portion of a building floor 10 is divided into individual rooms or office areas by means of partitions 12 having doorways 14 therein. A plurality of lighting fixtures 16 are located in ceiling structure 18. Electric light connector 20 is mounted on each of electric light fixtures 16 and is electrically connected to the electric circuits thereof. The details of electric light connector 20 are illustrated in FIGS. 5, 5A and 5B and will be described in greater detail hereafter.

Figure 4:
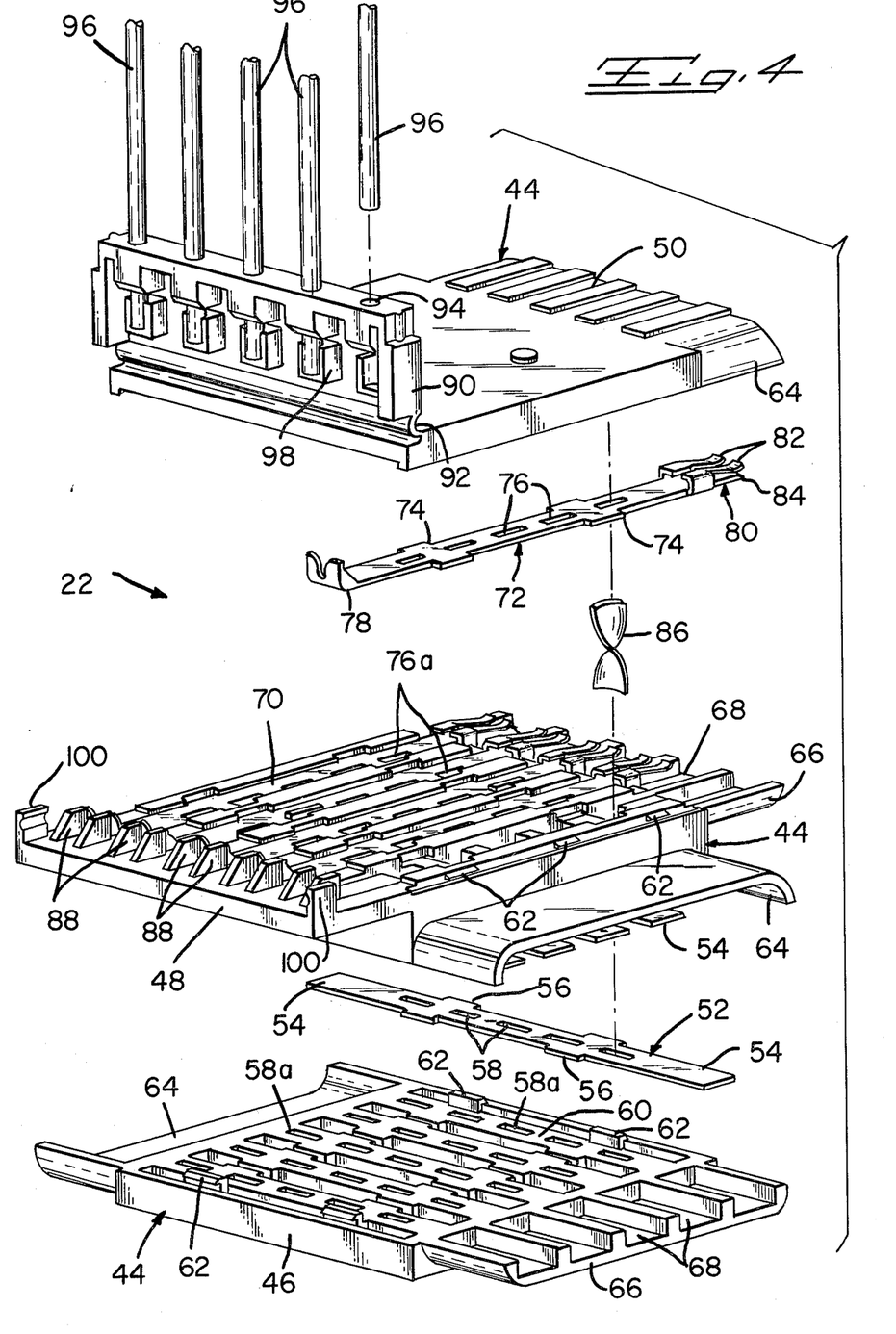
FIG. 4 is a perspective exploded view showing the parts of a control connector.
Figure 7:
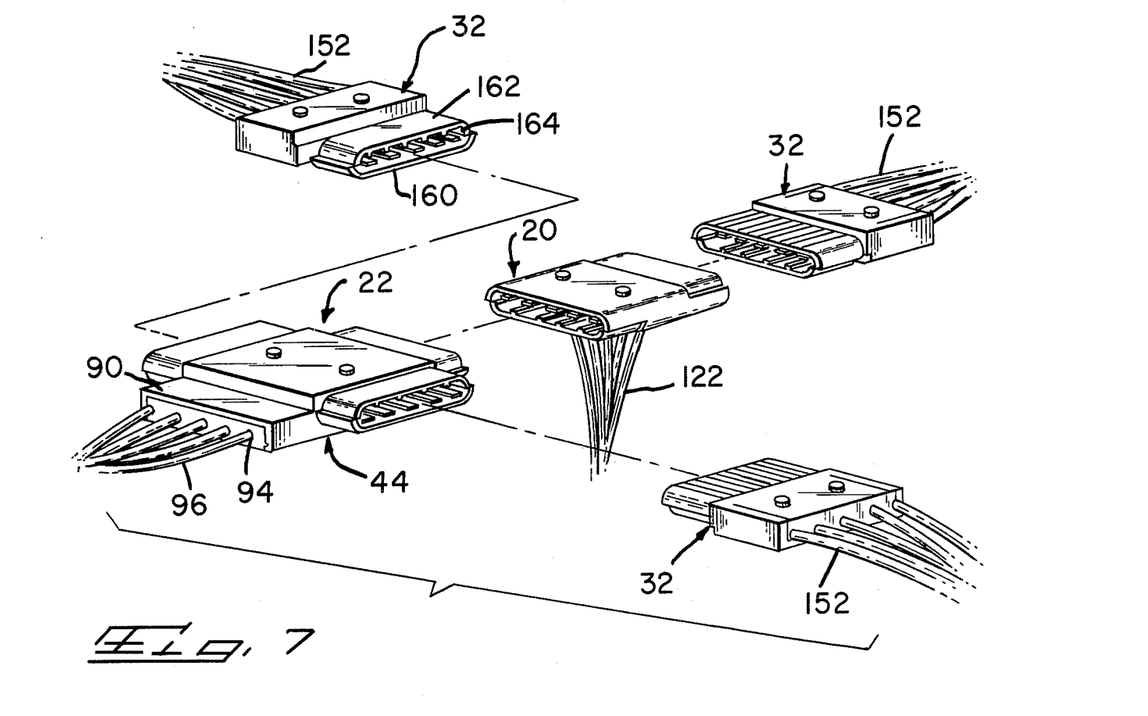
FIG. 7 is an exploded perspective view of the connectors of FIGS. 4, 5 and 6 in position for interconnection.

A control connector 22 is electrically connected to one of electric light connectors 20 and preferably the one closest to electric switch 24 and receptacle 26 in junction box 28 connected to power panel 30. Details of control connector 22 are illustrated in FIGS. 4 and 7 will be described in greater detail hereinafter.

Figure 6:
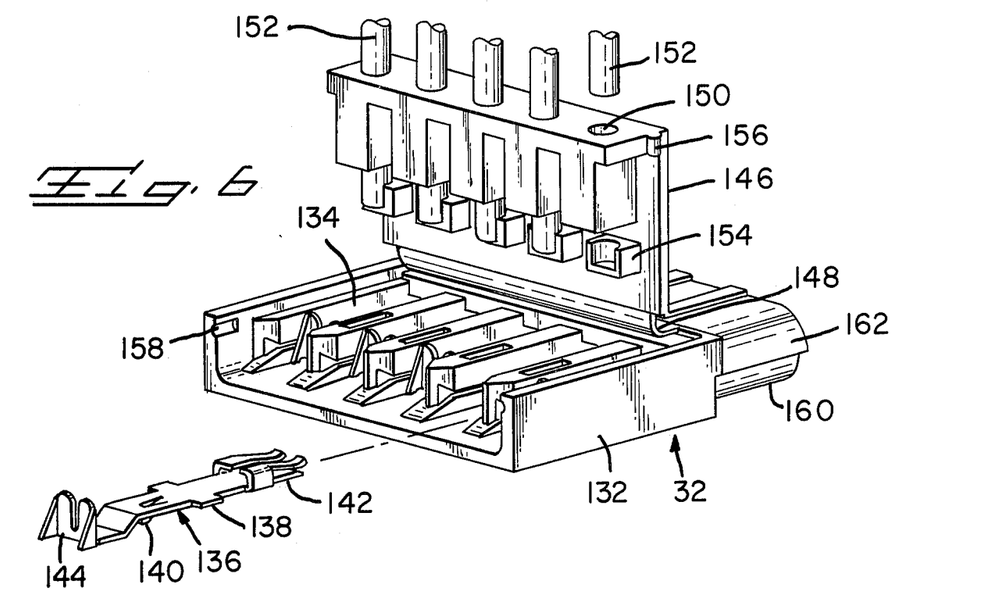
FIG. 6 is a perspective exploded view of an electrical connector that terminates electric leads and is electrically connectable with the connector of FIGS. 4 and 5.
Figure 8:
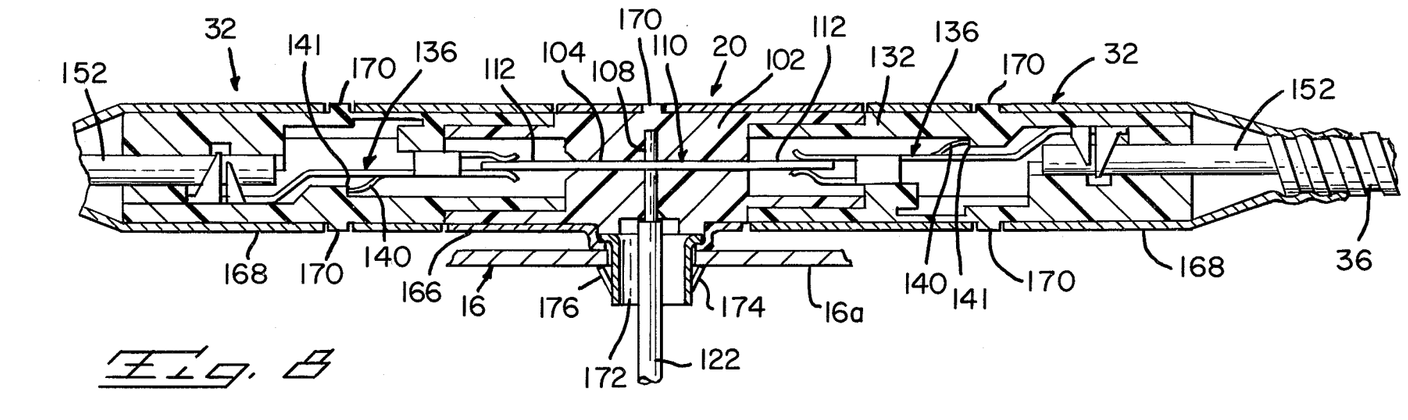
FIG. 8 is a cross-sectional view through the connectors of FIGS. 5 and 7 in electrical connection.

Cable connector or interconnection cable connector 32 is connected to the leads or wires in an armored cable 34 and cable connectors 32 are electrically connectable with electric light connectors 20 to interconnect lighting fixtures 16 together. Cable connectors 32 can also be connected to armored cables 36 supplying power from control connector 22 to another series of lighting fixtures 16 located in an adjacent room. Cable connectors 32 can also be connected to armored cable 38 connected between receptacle 26 in junction box 28 to control connector 22 to supply power to the lighting system within a room. An armored cable 40 is connected between switch 24 and control connector 22 to control the operation of the lighting system in the particular room. Armored cable 38 can be connected directly from power panel 30 to control connector 32 without going through junction box 28 and receptacle 26. Details of cable connectors 32 are illustrated in FIGS. 6, 7 and 8 and will be described in greater detail hereafter.

Figure 2:
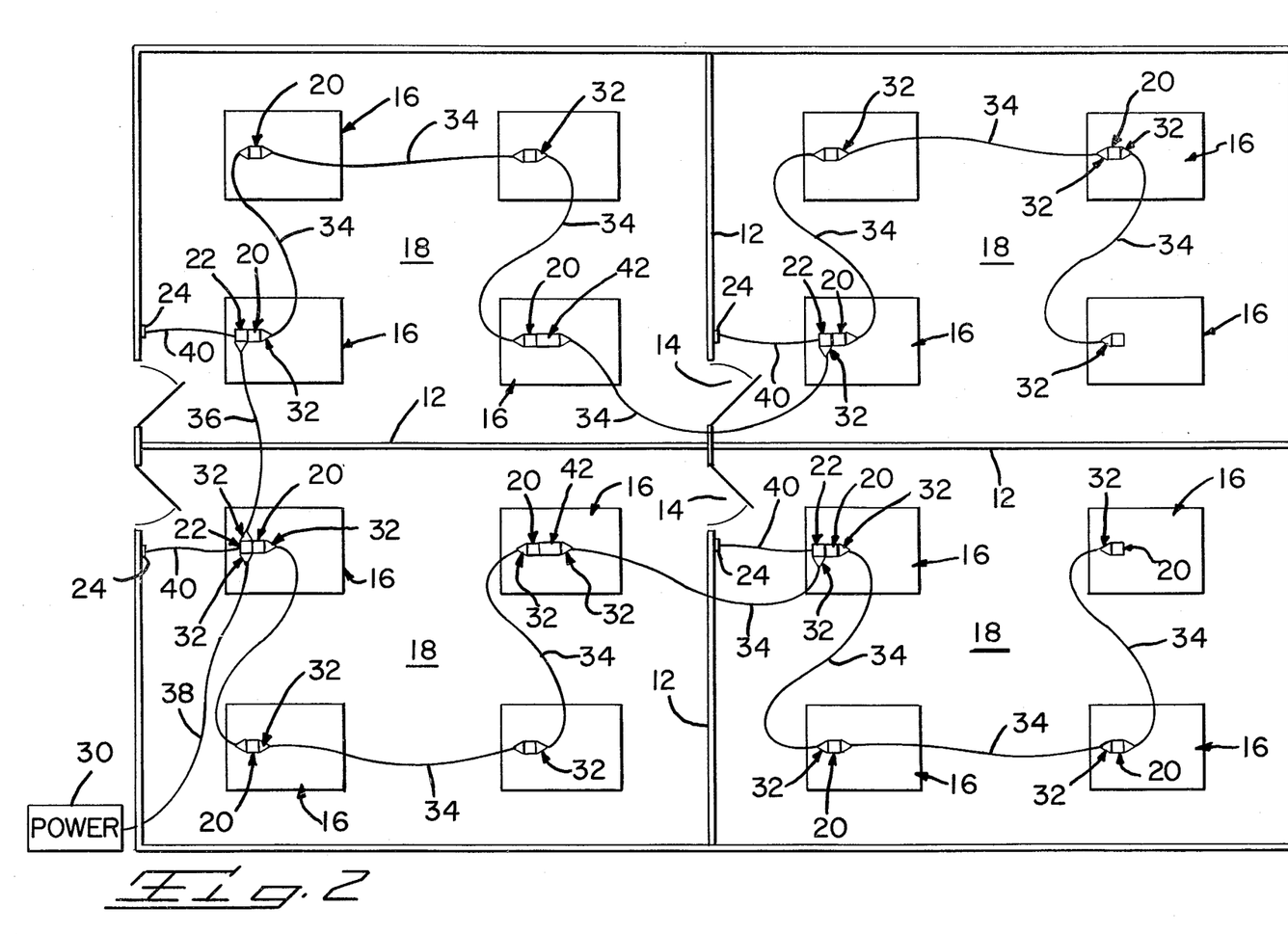
FIG. 2 is a schematic representation of an electrical distribution system using the invention.

FIG. 2 is a schematic of four rooms of a building that illustrate the use of electric light connectors 20, control connectors 22, cable connectors 32, and the respective armored cables 34, 36, 38, and 40 in conjunction with cross-over connectors 42 to supply power from a single power panel 30 to a series of lighting fixtures 16 in each room which are controlled from a switch 24 in each room.

Figure 3:
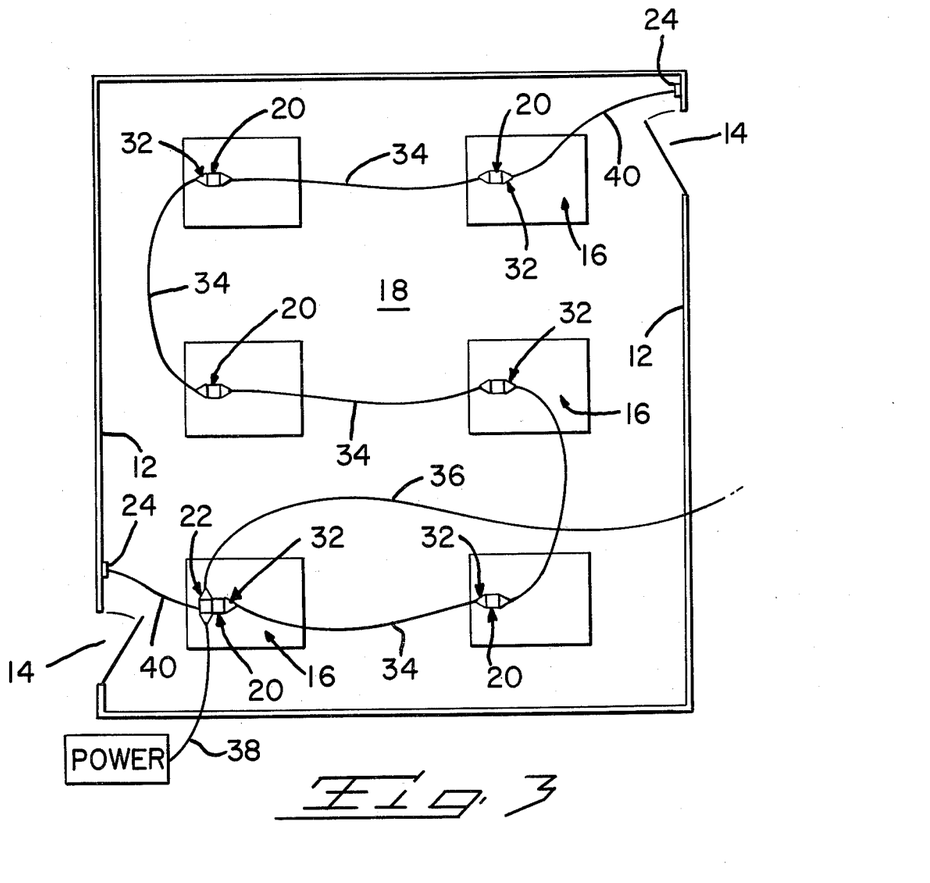
FIG. 3 is another schematic representation of another electrical distribution system using the invention.

FIG. 3 is a schematic illustrating a series of lighting fixtures 16 in a single room utilizing a three-way switching scheme. An armored cable 36 extends from a control connector 22 to another control connector 22 in an adjacent room to supply power to the lighting system therein.

Turning now to FIGS. 4 and 7, the details of control connector 22 are illustrated. An insulating housing 44, which is molded from a suitable dielectric material, includes a bottom section 46, a middle section 48, and a top section 50. Feed-through terminals 52 have tab sections 54 at each end, projections 56 and slots 58. Terminal-receiving areas 60 are located in the inside surface of bottom section 46 which have a configuration corresponding to that of feed-through terminals 52 in which the terminals are positioned. Identical terminal-receiving areas are provided in the bottom inside surface of middle section 48 which secure terminals 52 in position in housing 44 when bottom section 46 and middle section 48 are secured together when latch projections 62 on bottom section 46 snap into engagement with recesses (not shown) located on the inside surfaces of middle section 48 to snappably latch these housing sections together thereby securing terminals 52 in position therein. Each of sections 46 and 48 include hood sections 64 and 66 covering tab sections 54 of terminals 52. Hood sections 66 include recesses 68 therein.

The top surface of middle section 48 of housing 44 has contact-receiving areas 70 having a configuration to receive contacts 72 therein which are provided with projections 74, slots 76, insulation-displacing sections 78, and tab-engaging sections 80 which include spring tines 82 extending along a flat section 84. The inside surface of top section 50 of housing 44 has identical contact-receiving areas 70 which retain contacts 72 in position when sections 48 and 50 are latchably secured together by latch projections 62 that are latchably secured in latching recesses (not shown) located in section 50.

With terminals 52 in position in housing section 46, twisted connection members 86 are inserted through selected slots 58 therein of selected terminals 52 and they extend into corresponding slots 58a located in housing section 46. As can be discerned, the contact-engaging sections of connection members 86 are at right angles to each other by virtue of their twist configuration. The twisted sections have an arcuate configuration which enables them to make excellent springably electrical connection with terminals 52 when they are inserted into slots 58 thereof. After connection members 86 have been electrically connected with terminals 52, housing section 48 is latchably secured to housing section 46 with the upper parts of connection members 86 extending through respective slots 76a extending through section 48. Contacts 72 are then positioned within contact-receiving areas 70 with connection members 86 electrically engaging respective slots 76 thereof thereby electrically connecting terminals 52 as one level of contact members with respective contacts 72 as another level of contacts. After contacts 72 have been positioned in contact-receiving areas 70 and electrically connected with connection members 86, housing section 50 is latchably secured to housing section 48.

Insulation-displacing sections 78 of contacts 72 are positioned adjacent pairs of lugs 88. Housing section 50 includes lead-receiving flap 90 that is connected onto housing section 50 via integral hinge 92. Holes 94 extend through flap 90 through which ends of insulated electric leads 96 extend. The ends of leads 96 are disposed in stops 98 to limit their inward movement within flap 90 and position them for engagement with insulation-displacing sections 78. With leads 96 in position in holes 94 and stops 98 of flap 90, flap 90 is moved into engagement with housing section 48 with insulated electric leads 96 being forced into insulation-displacing sections 78 thereby making electrical connection therewith and latch members 100 latchably engage flap 90 thereby latching it in position. Leads 96 are in armored cable 40 connected to electric switch 24.

FIGS. 5, 5A and 5B illustrate electric light connector 20 which includes a dielectric housing 102 having terminal-receiving passageways 104 therethrough. Passageways 104 are provided with stop surfaces 106. Holes 108 having beveled openings are located in housing 102; they are in communication with respective passageways 104. Feed-through terminals 110 are positioned in passageways 104 which have beveled openings thereto. Each terminal 110 includes tab sections 112 and a lead-engaging section 114. Lead-engaging section 114 has an elongated slot 116 including opposed arcuate areas 118, the forward opposed arcuate areas 118 being in alignment with holes 108. The metal on each side of slot 116 is coined upwardly from the surface of the terminal to form generally arcuate surfaces on each side of the slot. Barbs 120 extend outwardly from the sides of section 114 which positions terminals 110 in passageways 104 so that opposed arcuate areas 118 are in alignment with respective holes 108. Insulated electric leads 122, which can have their ends stripped of insulation if desired, are inserted into holes 108 through opposed arcuate areas 118 whereafter terminals 110 are moved into passageways 104 thereby causing the edges of slots 116 to score the conductive members of leads 122 thereby forming mechanical and electrical connection therewith and securing the electric leads 122 within connector 20. The movement of terminals 110 within passageways 104 also causes barbs 120 to dig into the sides of passageways 104 thereby securing terminals 110 therein because of the beveled configuration of barbs 120. A lip 124 extends outwardly from the bottom of housing 102 surrounding the area where holes 108 are located. Hood sections 126, 128 cover tab sections 112 and hood sections 128 include recesses 130.

FIG. 6 illustrates cable connector 32 which includes a dielectric housing 132 having contact-receiving areas 134 therein. Contacts 136 are secured in contact-receiving areas 134 by projections 138 engaging stop surfaces (not shown) in contact-receiving areas 134 and a lance 140 engages a surface 141 (FIG. 8) in contact-receiving areas 134 to secure contacts 136 therein. Contacts 136 also contain tab-engaging sections 142 which are identical to tab-engaging sections 80 of contacts 72 and also insulation-displacing sections 144 which are identical to insulation-displacing sections 78 of contacts 72. A lead-receiving flap 146 is connected to housing 132 by integral hinge 148. Holes 150 are located in flap 146 to receive therethrough the ends of insulated electric leads 152 which are disposed in stops 154 to limit their inward movement. After leads 152 have been placed in position in flap 146, the flap is then moved to a closed position within housing 132 causing leads 152 to be forcefully positioned within insulation-displacing sections 144 of contacts 136 thereby mechanically and electrically securing electric leads 152 in electrical engagement with contacts 136. Projections 156 on flap 146 are disposed in recesses 158 thereby securing flap 146 in position. Hood sections 160, 162 cover tab-engaging sections 142 of contacts 136 and hood 162 contains recesses 164 therein.

FIG. 7 illustrates how connector 20 electrically connects with connectors 22, 32 and connector 22 electrically connecting with connectors 32 with the hood sections arranged for intermateable engagement.

Figure 1A:
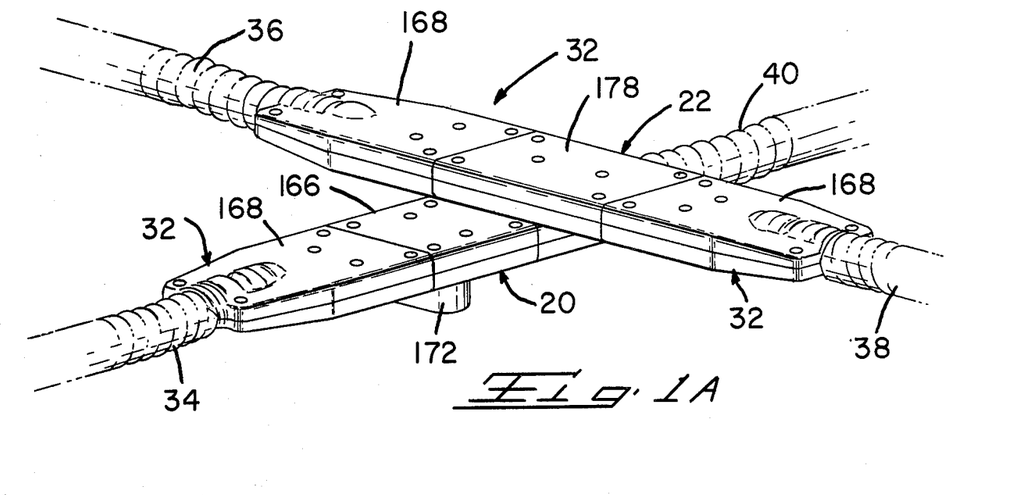
FIG. 1A is an enlarged perspective view of 1A of FIG. 1.

FIG. 8 illustrates a cross section of an electric light connector mounted on a housing 16a of light fixture 16 and being electrically connected with cable connectors 32. To protect the connectors, metal coverings 166 are mounted on connectors 20, 32 respectively. Projections 170 are provided on housings 20, 32 to properly position metal coverings 166, 168 thereon. Metal coverings 168 also engage armored cable 36. An oblong ring 172 is secured on metal covering 166 of connector 20 and surrounds electric leads 122 connected to the electric circuitry of light fixture 16 and extends through an opening 174 in housing 16a; ring 172 includes lances 176 to maintain it in position. Metal coverings 178 are located on connector 22 as illustrated in FIG. 1A in the same manner as metal coverings 166, 168 are located on connectors 22, 32.

Figure 9:
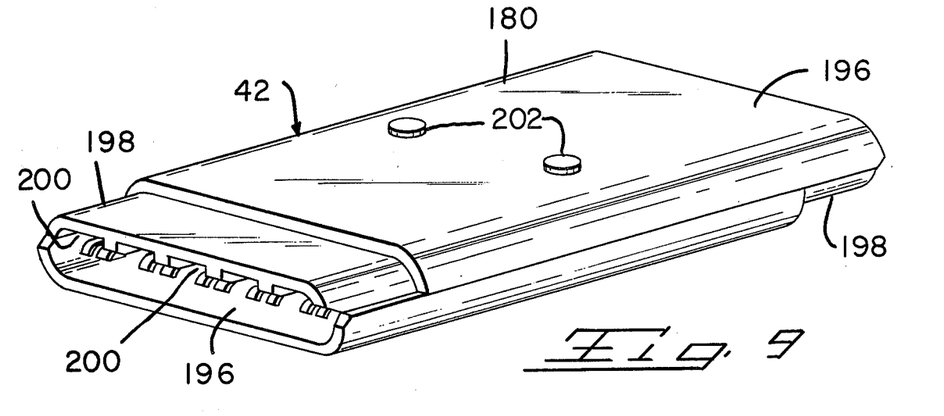
FIG. 9 is a perspective view of a cross-over connector.
Figure 10:
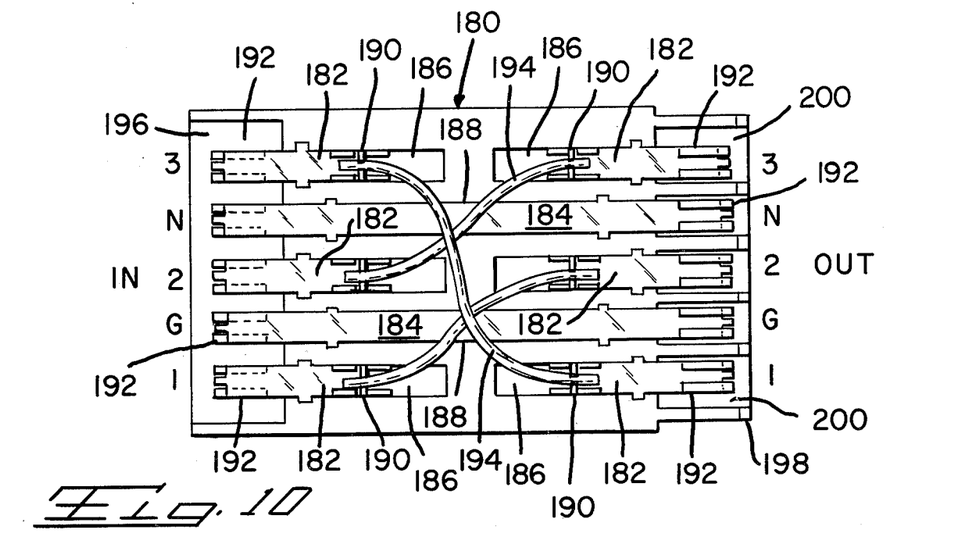
FIG. 10 is a top plan view of FIG. 9 with the top of the housing removed.

FIGS. 9 and 10 illustrate cross-over connector 42 which includes an insulating housing 180 molded from a suitable dielectric material and has identical sections housing contact members 182, 184 within contact-receiving areas 186, 188 respectively therein. Contact members 182 are similar in configuration as contact members 136 of FIG. 6 wherein they include insulation-displacing sections 190 and tab-engaging sections 192. Pairs of contact members 182 which are secured in aligned areas 186 within housing 180 are numbered 1, 2 and 3, whereas contact members 184 define feed-through terminals having tab-engaging sections 192 at their ends and are identified by the letters G and N. As can be discerned from FIG. 10, insulated electric leads 194 have their ends electrically connected in insulation-displacing sections 190 of contact members 182 so that contact member 182 identified as 1 IN is connected to contact member 182 2 OUT, contact member 182 2 IN is connected to contact member 182 3 OUT, and contact member 182 3 IN is connected to contact member 182 1 OUT thereby forming a cross-over connector 42 that is used in the electrical distribution system illustrated in FIG. 2 to enable electrical power from one electrical system in one room to be supplied to another electrical system in an adjacent room so that the electrical switch in the adjacent room can be used to independently control the operation of the electrical system in the adjacent room. Housing 180 includes hood sections 196, 198 which cover tab-engaging sections 192 of contact members 182, 184 and hood section 198 has recesses 200 located therein. Housing 180 is also provided with projections 202 on each section thereof so that a metal covering (not shown) can be secured thereon in the same manner as is located on connectors 20, 22 and 32.

Figure 11:
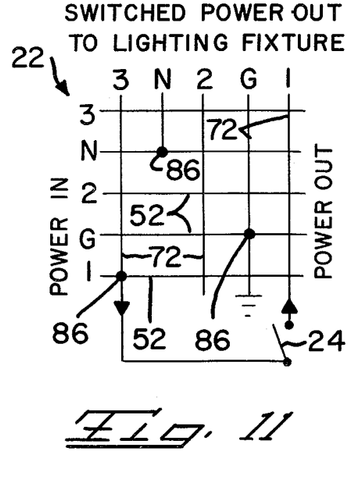
FIGS. 11-15 are schematic views showing the interconnections between the contacts of the connector of FIG. 4 to form selected lighting arrangements.

FIGS. 11-14 illustrate schematics of control connector 22 and the connections between levels of contact members 52, 72 by connection members 86 to control the operation of the electric light systems. As shown in FIG. 11, control connector 22 is connected in such a manner providing single-circuit single-level switching so that all of lighting fixtures 16 are connected so as to be turned on or off by a single switch 24.

Figure 12:
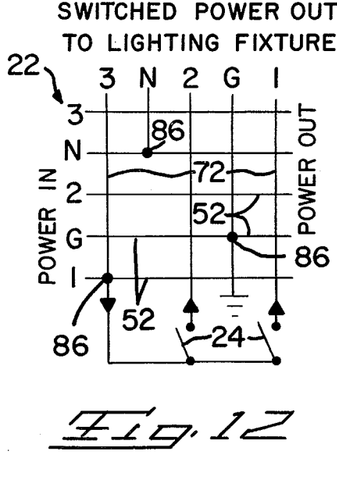

FIG. 12 illustrates control connector 22 having levels of contact members 52, 72 interconnected by connection members 86 providing a single-circuit multi-level switching arrangement whereby some or one half of the lighting fixtures 16 are connected to one of switches 24 and the remaining lighting fixtures 16 are connected to another switch 24 thereby enabling some or one half of the lighting fixtures to be controlled by switch 24 and the remaining light fixtures to be controlled by another switch 24.

Figure 13:
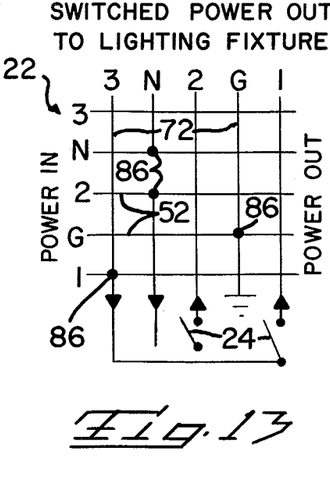

FIG. 13 illustrates another arrangement constituting a dual-circuit multi-level switching arrangement similar to that of FIG. 12 with the exception that more light fixtures can be connected to each of switches 24 thereby controlling the operation of a larger number of lighting fixtures because of the increase in the current capacity capability of control connector 22. As can be discerned, member 72-N is discontinuous between contact member 52-N and 52-2 so that contact connection members 86 connect contact member 72-N to contact member 52-N and contact member 72-N to contact member 52-2.

Figure 14:
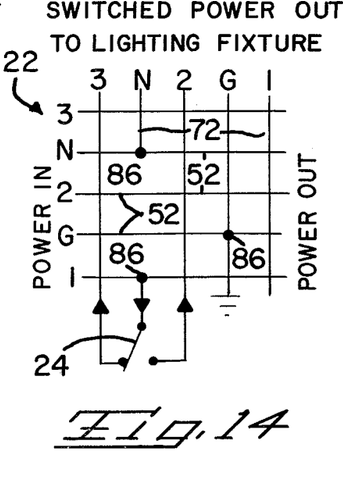

FIG. 14 illustrates the manner in which control connector 22 is arranged to interconnect the two levels of contact members 52, 72 by connection members 86 to provide three-way switching for the arrangement as illustrated in FIG. 3. As in FIG. 14, contact member 72-N is discontinuous between contact member 52-N and 52-1 so that connection members 86 connect contact member 72-N to contact member 52-N and contact member 72-N to contact member 52-1.

Figure 15:
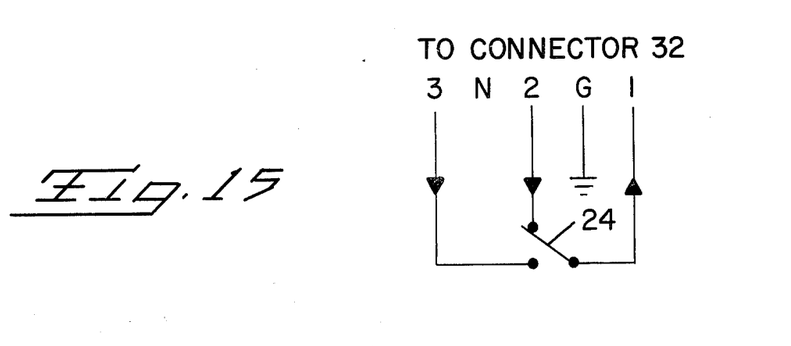

FIG. 15 illustrates the schematic for connecting switch 24 connected to the last electric light connector 20 of FIG. 3 so that the electric leads from switch 24 are connected in the manner illustrated to the contact members identified as 1, 2 and 3 with the G terminal and lead connected thereto being connected to ground.

We claim:

1. An electrical distribution system for an electric lighting system comprising a plurality of electric lights, an electric power box for supplying electrical power to the electric lights, an electric switch for switching the electric lights on or off, and electric connectors for electrically interconnecting the electric lights, power box and switch characterized in that:

an electric light connector mountable on each of the electric lights and comprising an insulating housing having contact members therein for electrical connection with the electric leads of each of the electric lights;

a control connector electrically connectable with one of said electric light connectors and comprising an insulating housing having a first level of contact members and a second level of contact members insulated from each other, connection members extending between said first and second levels of contact members and interconnecting them in a preselected manner, one of said first and second levels of contact members being electrically connectable with said contact members of said light connector and with electric leads connected to said electric switch;

a power-in connector including an insulating housing having contact members electrically connectable with electric power leads from said power box and electrically connectable with the other of said first and second levels of contact members;

an interconnection connector assembly comprising electric leads electrically connected to contact members in insulating housings, the contact members in one of the insulating housings being electrically connectable with the contact members in said light connector having said control connector connected therewith and the contact members of the other of the insulating housings being electrically connectable with the contact members of another of said electric light connectors.

2. An electrical distribution system as set forth in claim 1 characterized in that a power-out connector assembly includes an insulating housing having contact members therein electrically connectable with the other of said first and second levels of contact members and with electric leads of another of said power-in connector electrically connectable to the contact members of an electric light connector of another plurality of electric lights.

3. An electrical distribution system as set forth in claim 1 characterized in that said insulating housing of said electric light connectors includes contact-receiving openings therethrough and having stop surfaces against which lead-connecting sections of said contact members engage to limit movement of said contact members in said contact-receiving openings, said lead-connecting sections having a slot therein including opposing arcuate areas, said opposing arcuate areas being coincident with holes in said housing through which electric leads are introduced and which extend through said opposing arcuate areas, barbs provided on said contact members which bite into said insulating housing to secure said contact members therein when said contact members are pushed along said contact-receiving openings until said lead-connecting sections engage said stop surfaces whereby edges of said slot bite into said electric leads thereby forming electrical connection therewith and securing said electric leads therein.

4. An electrical distribution system as set forth in claim 1 characterized in that the electric light connector of the last electric light of said plurality of lights includes a cross-over connector electrically connected thereto and having an insulating housing provided with a first series of contacts and a second series of contacts insulated from each other, feed-through contacts disposed in said housing insulated from each other and from said first and second series of contacts, electric leads in said housing connecting the contacts of said first series of contacts to different contacts of said second series of contacts, said first series of contacts and said feed-through contacts being electrically connected to said contact members of said last electric light connector and said second series of contact members being electrically connected to contact members of another interconnection connector assembly.

5. An electrical distribution system as set forth in claim 1 characterized in that the electric light connector on the last of said plurality of electric lights has a switch connector including an insulating housing having electrical contacts connected to leads connected to another electric switch and the electrical contacts are connectable to the contact members in said insulating housing of said electric light connector thereby establishing three-way switching arrangement for said electric light system.

6. An electrical distribution system for connecting together a plurality of electric utilization means supplied by electrical power from an electric power supply means and switch means for controlling operation of the electrical distribution system, said electrical distribution system comprising:

utilization connector means for mounting onto each of the electric utilization means and including an insulating housing having electric terminal means therein for electrical connection to the electrical circuit of the electric utilization means;

control connector means including an insulating housing having first and second levels of electric contact means therein insulated from one another, connection means extending between said first and second levels of contact means and interconnecting them in a preselected manner, one of said first and second levels of contact means being electrically connectable with said electric terminal means of said utilization connector means and with electric lead means connected with the switch means;

power-in connector means including an insulating housing having electric terminal contact means therein electrically connectable with electric power leads from the electric power supply means and electrically connectable with the other of said first and second levels of contact means; and interconnection connector assembly means including electrical lead means electrically connected to electric contact member means disposed in respective insulating housing means, the electric contact member means in one of the insulating housing means being electrically connectable with the electric terminal means in said utilization connector means having said control connector means connected therewith and the electric contact member means in the other of the insulating housing means being electrically connectable with the electric terminal means of another of said utilization connector means.

7. An electrical distribution system as set forth in claim 6 and further comprising:

power-out connector assembly means including electrical lead means electrically connected to electric terminal contact means disposed in respective insulating housing means, the electric terminal contact means in one of the respective insulating housing means being electrically connectable with the other of said first and second levels of contact means of said control connector means and the electric terminal contact means in another of the respective insulating housing means being electrically connectable with the electric terminal means of a further utilization connector means of another electric utilization means.

8. An electrical distribution system as set forth in claim 6 further comprising cross-over connector means including insulating housing means having first and second series of contact means insulatingly spaced from each other and a plurality of feed-through terminal means insulatingly spaced from each other and from said first and second series of contact means, electric lead means in said insulating housing connecting the contact means of said first series of contact means to different contact means of said second series of contact means, said first series of contact means and said plurality of feed-through terminal means being electrically connectable to the electric terminal means of the utilization connector means of the last of the plurality of electric utilization means and said second series of contact means and said plurality of feed-through terminal means being electrically connectable to the electric contact member means of another interconnection connector assembly means.

9. An electrical distribution system as set forth in claim 6 further comprising switch connector means including insulating housing means having switch contact means therein electrically connectable to electric lead means connected to another switch means and being electrically connectable with the electric terminal means of the utilization connector means of the last electric utilization means thereby establishing a three-way switching arrangement for the electric utilization means.

* * * * *